United States Patent Office 3,490,907
Patented Jan. 20, 1970

3,490,907
NEGATIVE WORKING PRINTOUT REPRODUCTION MATERIAL COMPRISING FERROCENE AND METHOD OF USE

Gunther Otto Schenck, Mulheim (Ruhr), and Ernst August Hackmann and Johannes Munder, Wiesbaden-Biebrich, Germany, assignors to Kalle Aktiengesellschaft, Wiesbaden-Biebrich, Germany, a corporation of Germany
No Drawing. Filed Apr. 12, 1965, Ser. No. 447,532
Claims priority, application Germany, Apr. 15, 1964, K 52,677
Int. Cl. C07f 15/02; G03c 1/64, 5/24
U.S. Cl. 96—49                                   36 Claims

ABSTRACT OF THE DISCLOSURE

A negative working printout reproduction material comprising a support and a layer which comprises a light-sensitive ferrocene compound, a halogenated hydrocarbon and optionally a phenol, naphthol or an amide, said material is sensitive to ultraviolet and visible light and may be fixed by heating.

---

The present invention relates to novel negative-working reproduction materials which are sensitive in the ultraviolet and the visible ranges of the spectrum and which may be fixed by the influence of heat.

It is known that certain organic halogen compounds, such as tetrabromoethane, bromoform and others, when exposed to light, react with a plurality of organic compounds, e.g. condensation products of aldehydes with amines, resins of phenols and aldehydes, amines, phenols and CH-active substances, to form dyestuffs.

The known methods are disadvantageous because UV radiators must be used in order to achieve reasonable times of exposure. In some cases, sensitization to light in the visible range of the spectrum may be effected by adding a dyestuff. However, in this case, the dyestuff is also present in the areas not struck by light and can be removed from these areas only by washing with a suitable solvent.

Further, it is known that ferrocene and halogenated hydrocarbons undergo a photochemical reaction under the influence of $\gamma$-rays, ferricinium tetrahalogen ferrates being some of the products formed (cr. Koerner von Gustorf, H. Köller, M.-J. Jun and G. O. Schenck, "Chemie-Ingenieur-Technik," 35, page 591 (1963).

Now it has been unexpectedly found that, upon image-wise exposure of mixtures of halogenated hydrocarbons and ferrocene present on a support as a uniform layer, negative brown copies are produced which may be fixed by heating to 80 to 120° C. Fixation is due to the fact that the unaltered ferrocene and halogenated hydrocarbon evaporate, while a brown light-decomposition product remains in the areas affected by light. Thus, on a colorless support, a negative, stable, brown image of the master appears.

The reproduction material according to the invention comprises a support, preferably of a paper or a plastic film, and a light-sensitive layer, the latter comprising substituted or unsubstituted ferrocene and a halogenated hydrocarbon of the following general formula

wherein:

X is chlorine, bromine or iodine, and R, $R_1$ and $R_2$, which may be identical or different, are chlorine, bromine, iodine, hydrogen, a heterocyclic group, aryl, aralkyl, alkenyl, or alkyl, the latter, if desired, being substituted by chlorine bromine or iodine and/or forming a member of an aliphatic chain.

To the ferrocene, other known substances may be added which, upon exposure to light, form dyestuffs with halogenated hydrocarbons, e.g. amines and/or phenols. Combinations of this kind not only have the advantage of a considerably increased light-sensitivity, they are also light-sensitive even in the visible range of the spectrum, as is, e.g., the combined system of chlorohydrocarbon and ferrocene.

In addition to ferrocene, substitution products thereof may be used, such as, e.g., diacetyl ferrocene, dipropionyl ferrocene, dibenzoyl ferrocene, bis-(3-nitrobenzoyl) ferrocene, bis-(4-dimethylaminobenzoyl) ferrocene and ferrocene dicarboxylic acid.

Further components which may be added to the light-sensitive system of the invention are amines and/or phenols, e.g. aryl amines which may be mono- or disubstituted at the nitrogen atom, and/or substituted or unsubstituted amines, the amino group of which is linked to a heterocyclic nucleus. Phenols, naphthols and amines in which the amino group is a substituent to an aromatic or heterocyclic ring or a member of a heterocyclic ring have proved to be of particular advantage. N-vinyl compounds with heterocyclic or aromatic groups may also be used.

Tetrabromomethane is a halogenated hydrocarbon which produces particularly good results. However, carboxylic acid chlorides and the derivatives thereof, or halogenated synthetic substances, such as chlorinated rubber, may also be used.

A mixture of the different classes of additives mentioned above has proved to be of particular advantage.

For the preparation of the reproduction material of the invention, a solution of halogenated hydrocarbon, ferrocene, and, if desired, an amine and/or phenol, is coated onto a support and this solvent is evaporated. Suitable supporting materials are wood, glass, plastic film, metal foil, fabric, and, with particular advantage, paper. For better adhesion to a support having a smooth surface and for the production of thicker layers, synthetic resins and waxes may be added to the light-sensitive substances. If some of the substances to be applied can be dissolved in water only, whereas others dissolve only in organic solvents, it is possible to apply the aqueous layer in the form of a precoat onto which the organic layer is coated after drying the former. In order to improve the shelf-life of the unexposed reproduction material, an essential component of the light-sensitive layer, e.g. the halogenated hydrocarbon, may be applied in the form of a gas shortly before exposure.

As light sources to which the materials of the invention are exposed, there may be used conventional incandescent light bulbs as well as commercial mixed light or UV radiators.

Fixation of the exposed material is effected by a brief heat treatment of 80 to 120° C., which may be performed in a drying cupboard, or by means of heated plates, or by an infra-red source, or by passing the material over a heated roller, for example.

The material according to the present invention may be used for the preparation of contact copies as well as reflex copies. It is particularly suitable for the preparation of re-enlargements from microfilms.

The material of the invention is superior to known materials because of its higher light-sensitivity, especially in the visible range of the spectrum, and has the further advantage that it can be very easily processed.

The invention will be further illustrated by reference to the following specific examples:

EXAMPLE 1

3 grams of tetrabromomethane and 3 grams of ferrocene are dissolved in 30 ml. of trichloroethylene, and a base paper customarily used in the reproduction field is soaked with this solution. After evaporation of the solvent, the material is exposed for 30 seconds under a master, using a 200 watt incandescent bulb as the light source. The material is then heated for 2 minutes to 100° C. in a drying cupboard so that excess tetrabromomethane and ferrocene are volatilized from the paper and a negative brown copy of the master is obtained on a colorless background.

EXAMPLE 2

3 grams of tetrabromomethane, 3 grams of ferrocene and 0.1 gram of α-naphthylamine are dissolved in 15 ml. of acetone and 15 ml. of trichloroethylene, and a base paper is soaked with this solution. After evaporation of the solvent, the material is exposed for 15 seconds under a master, to the light of a 200 watt incandescent bulb. The exposed paper is fixed by passing it under an infrared radiator. Intense, brown to violet images are obtained.

EXAMPLE 3

Equally good results are obtained by replacing the α-naphthylamine employed in Example 2 by resorcinol. Brownish-violet images are obtained.

EXAMPLE 4

Alternatively, the α-naphthylamine employed in Example 2 may be replaced by a mixture of α-naphthylamine and α-naphthol, with similar results. Dark brown images are obtained.

EXAMPLE 5

A red image is obtained when the α-naphthylamine employed in Example 2 is replaced by 2-methyl-indole.

EXAMPLE 6

3 grams of diacetyl ferrocene, 3 grams of tetrabromomethane and 1 gram of 2-methyl-indole are dissolved in a mixture of acetone and trichloroethylene and a base paper is soaked in this solution. The material is exposed for 30 seconds, under a master, to the light of a mixed light radiator of 500 watts and then fixed in a drying cupboard. Red images are obtained.

EXAMPLE 7

3 grams of N-vinyl-carbazole, 3 grams of ferrocene, 3 grams of bromoform and 3 grams of polystyrene are dissolved in trichloroethylene and the viscous solution thus obtained is coated onto a paper base which is impermeable to solvents. After evaporation of the solvent, the material is exposed for 30 seconds under a master to the light of a 200 watt incandescent bulb. The exposed paper is then fixed by passing it under an infra-red radiator. Brown images on a colorless background are obtained.

EXAMPLE 8

0.5 gram of 2-methyl-indole, 1 gram of ferrocene and 3 grams of tetrabromomethane are dissolved in acetone, and the solution is applied to a transparent paper. By means of a 500 watt projector, a reenlargement is produced from a silver halide negative film at a scale of 1:8. The time of exposure is 45 seconds. After fixation of the material in the drying cupboard, an easily readable red image on a colorless background is obtained. The copy on the transparent support may be used as an intermediate copy from which additional reproductions may be made.

EXAMPLE 9

3 grams of tetrabromomethane, 3 grams of ferrocene, and 0.5 gram of 2,4-dimethyl-3-carbethoxy pyrrole are dissolved in trichloroethylene, and an acetate film is soaked in this solution. After evaporation of the solvent, the material is exposed for 10 seconds under a master, using a carbon arc lamp (with special tracing carbons). The exposed film is fixed in a drying cupboard. The dark-yellow dyestuff formed has a very good covering capacity, so that the film may be used with advantage for the production of additional copies, e.g., on photoprinting material.

It will be obvious to those skilled in the art that many modifications may be made within the scope of the present invention without departing from the spirit thereof, and the invention includes all such modifications.

What is claimed is:

1. Light-sensitive material comprising a support and a light-sensitive layer thereon, the latter comprising a compound selected from the group consisting of ferrocene, diacetyl ferrocene, dipropionyl ferrocene, dibenzoyl ferrocene, bis-(3-nitrobenzoyl) ferrocene, bis-(4-dimethylaminobenzoyl) ferrocene, and ferrocene dicarboxylic acid; and a halogenated hydrocarbon having the formula

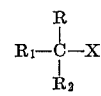

in which X is selected from the group consisting of chlorine, bromine and iodine, and R, $R_1$ and $R_2$ are selected from the group consisting of chlorine, bromine, iodine, hydrogen, and heterocyclic, aryl, aralkyl, alkenyl, and alkyl groups.

2. Light-sensitive material according to claim 1 in which the alkyl substituent is substituted by a member selected from the group consisting of chlorine, bromine and iodine.

3. Light-sensitive material according to claim 1 in which the alkyl substituent is a member of an aliphatic chain.

4. Light-sensitive material according to claim 1 in which the ferrocene is ferrocene.

5. Light-sensitive material according to claim 1 in which the ferrocene is diacetyl ferrocene.

6. Light-sensitive material according to claim 1 in which the halogenated hydrocarbon is tetrabromomethane.

7. Light-sensitive material according to claim 1 in which the halogenated hydrocarbon is bromoform.

8. Light-sensitive material according to claim 1 in which the light-sensitive layer contains, in addition, an additive selected from the group consisting of a phenol, a naphthol, and an amine.

9. Light-sensitive material according to claim 8 in which the additive is an amine in which amino group is a substituent to an aromatic ring.

10. Light-sensitive material according to claim 8 in which the additive is an amine in which the amino group is a substituent to a heterocyclic ring.

11. Light-sensitive material according to claim 8 in which the additive is an amine in which amino group is a member of a heterocyclic ring.

12. Light-sensitive material according to claim 8 in which the additive is α-naphthylamine.

13. Light-sensitive material according to claim 8 in which the additive is resorcinol.

14. Light-sensitive material according to claim 8 in which the additive is a mixture of α-naphthylamine and α-naphthol.

15. Light-sensitive material according to claim 8 in which the additive is 2-methyl-indole.

16. Light-sensitive material according to claim 8 in which the additive is N-vinyl carbazole.

17. Light-sensitive material according to claim 8 in which the additive is 2,4-dimethyl-3-carbethoxy pyrrole.

18. A reproduction process which comprises exposing a supported light-sensitive layer to light under a master and fixing the resulting image by heating, the layer comprising a compound selected from the group consisting of ferrocene, diacetyl ferrocene, dipropionyl ferrocene, dibenzoyl ferrocene, bis-(3-nitrobenzoyl) ferrocene, bis-(4-dimethyl-aminobenzoyl) ferrocene, and ferrocene dicarboxylic acid; and a halogenated hydrocarbon having the formula

in which X is selected from the group consisting of chlorine, bromine, and iodine, and R, $R_1$, and $R_2$ are selected from the group consisting of chlorine, bromine, iodine, hydrogen, and heterocyclic, aryl, aralkyl, alkenyl, and alkyl groups.

19. A reproduction process according to claim 18 in which the alkyl substituent is substituted by a member selected from the group consisting of chlorine, bromine, and iodine.

20. A reproduction process according to claim 18 in which the alkyl substituent is a member of an aliphatic chain.

21. A reproduction process according to claim 18 in which the ferrocene is ferrocene.

22. A reproduction process according to claim 18 in which the ferrocene is diacetyl ferrocene.

23. A reproduction process according to claim 18 in which the halogenated hydrocarbon is tetrabromomethane.

24. A reproduction process according to claim 18 in which the halogenated hydrocarbon is bromoform.

25. A reproduction process according to claim 18 in which the light-sensitive layer contains, in addition, an additive selected from the group consisting of a phenol, a naphthol, and an amine.

26. A reproduction process according to claim 25 in which the additive is an amine in which the amino group is a substituent to a aromatic ring.

27. A reproduction process according to claim 25 in which the additive is an amine in which the amino group is a substituent to a heretocyclic ring.

28. A reproduction process according to claim 25 in which the additive is an amine in which the amino group is a member of a heterocyclic ring.

29. A reproduction process according to claim 25 in which the additive is α-naphthylamine.

30. A reproduction process according to claim 25 in which the additive is resorcinol.

31. A reproduction process according to claim 25 in which the additive is a mixture of α-naphthylamine and α-naphthol.

32. A reproduction process according to claim 25 in which the additive is 2-methyl-indole.

33. A reproduction process according to claim 25 in which the additive is N-vinyl carbazole.

34. A reproduction process according to claim 25 in which the additive is 2,4-dimethyl-3-carbethoxy pyrrole.

35. Light-sensitive material according to claim 8 in which the additive is an N-vinyl compound with heterocyclic and aromatic groups.

36. A reproduction process according to claim 25 in which the additive is an N-vinyl compound with heterocyclic and aromatic groups.

References Cited

UNITED STATES PATENTS

| 3,042,515 | 7/1962 | Wainer | 96—90 XR |
| 3,046,125 | 7/1962 | Wainer | 96—90 XR |
| 3,335,008 | 8/1967 | Dubosc | 96—92 XR |

OTHER REFERENCES

Belder et al., "Paper Chromatography of Ferrocene and Its Derivatives," Chemistry And Industry, Aug. 1, 1959, pp. 996–997.

Von Gustorf et al., "Chemie-Ingenier-Technik," 35, January 1963, p. 591.

Nesmeyanov et al., "Acad. of Science Bulletin," U.S.S.R., January–June 1956, pp. 749–751.

Rosenblum et al., "Journal of American Chemical Society," vol. 85, May 20, 1963, pp. 1450–1458.

Sprague et al., "Photo Science & Eng.," vol. 5, No. 2, March–April 1961, pp. 98–103.

NORMAN G. TORCHIN, Primary Examiner

C. BOWERS, Assistant Examiner

U.S. Cl. X.R.

96—48, 90, 92; 260—439